UNITED STATES PATENT OFFICE.

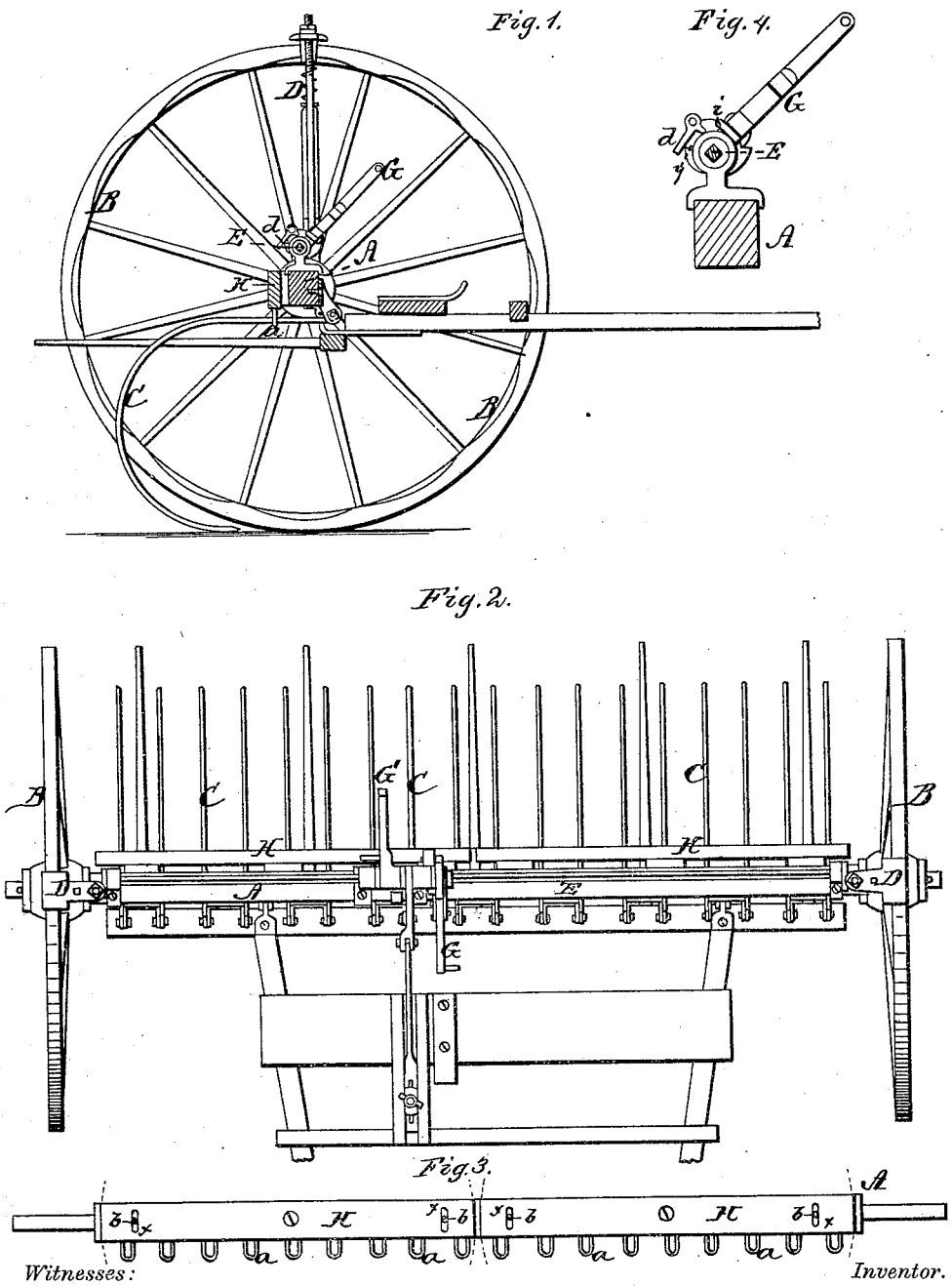

GEORGE SWEET, OF DANSVILLE, NEW YORK.

IMPROVEMENT IN HORSE HAY-RAKES.

Specification forming part of Letters Patent No. 145,029, dated November 25, 1873; application filed October 30, 1873.

*To all whom it may concern:*

Be it known that I, GEORGE SWEET, of Dansville, in the county of Livingston and in the State of New York, have invented certain new and useful Improvements in Horse Hay-Rake; and do hereby declare that the following is a full, clear, and exact description thereof, reference being had to the accompanying drawings, and to the letters of reference marked thereon, making a part of this specification.

The nature of my invention consists, first, in evener-bars attached behind the place of hinging the teeth, to enable the teeth to follow the ground; and, second, in a device for holding the brakes down on the wheels for dumping, all of which will be hereinafter more fully set forth.

In order to enable others skilled in the art to which my invention appertains to make and use the same, I will now proceed to describe its construction and operation, referring to the annexed drawing, in which—

Figure 1 is a longitudinal section of my improved hay-rake, and Fig. 2 is a plan view of the same. Fig. 3 is a rear view of the evener-bar; and Fig. 4 is an enlarged side view of the foot-lever for operating the brakes, with the device for locking the same.

A represents the axle, with driving-wheels B B. C C are the rake-teeth, hinged below and in front of the axle. D D are the brakes, operated by means of cranks on the ends of a square shaft, E, which is placed in suitable boxes on top of and parallel with the axle A. G is the foot-lever for applying the brakes, and G' the hand-lever for raising the rake-teeth. These parts are all constructed and arranged substantially in the same manner as described in a former patent for hay-rake granted to me. On the back of the axle A are two bars, H H, provided at their lower edges with metal loops *a a*, through which the rake-teeth C C pass. Each of the bars H is pivoted through its center, and the extent of its rocking motion limited by means of pins *b b*, extending from the axle through slots *x x* in the ends of the bar.

In operation, as the rake passes over uneven ground, one end of each of the bars H causes the teeth to act upon the lowest ground, and the other end causes the teeth to act upon the highest ground, inasmuch as the teeth which pass over the highest ground cause the bar to rock on its pivot, and hence force the teeth on the other end of the bar onto the lowest ground.

In using a rake in a field it oftentimes happens that one portion of the ground over which the rake is to pass is level and the other inclined or slightly hilly. I have, therefore, applied two pivoted bars, H, as described, instead of one long bar extending the whole length of the axle, so that in operation the teeth connected to one bar will pass over the smooth ground, while those of the other will be made to pass over the uneven ground. In passing over a ridge the inner ends of the two bars are elevated and the outer ends depressed, so that the teeth will act on both sides of the ridge, the center of the axle being directly over the top of the ridge.

On the side of the foot-lever G is pivoted a pawl or hand, *d*, which, when the brakes have been brought down on the wheels by said lever, catches in a notch, *y*, in the box supporting the shaft E, thereby holding or locking the brakes on the wheels until the teeth are lifted high enough to let out the hay, when the hand *d* is pushed out of the notch *y* by a projection, *i*, on the back of the foot-lever, and the teeth will fall back. The pawl or hand *d* may be used on the hand-lever G', and in this case an iron is fastened to the timber on the thills to push it out.

Having thus fully described my invention, what I claim as new, and desire to secure by Letters Patent, is—

1. The evener-bars H H, pivoted in their centers, and provided with loops *a a*, through which the rake-teeth pass, and having slots *x x* in their ends for the passage of the pins *b b*, all substantially as and for the purposes herein set forth.

2. The hand or pawl *d*, in combination with the notch *y* and projection *i*, all as and for the purposes herein set forth.

In testimony that I claim the foregoing I have hereunto set my hand and seal this 30th day of September, 1873.

GEORGE SWEET. [L. S.]

Witnesses:
 TIMOTHY B. GRANT,
 GEO. R. SMITH.